(12) United States Patent
Purcell

(10) Patent No.: US 6,286,138 B1
(45) Date of Patent: Sep. 4, 2001

(54) TECHNIQUE FOR CREATING REMOTELY UPDATABLE PROGRAMS FOR USE IN A CLIENT/SERVER ENVIRONMENT

(75) Inventor: Keith J. Purcell, Willow Spring, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,528

(22) Filed: Dec. 31, 1998

(51) Int. Cl.⁷ ................ G06F 9/445; G06F 9/45
(52) U.S. Cl. .................. 717/11; 717/8; 709/203; 709/221; 713/100
(58) Field of Search .................. 717/11, 5, 2, 8; 709/203, 221, 217; 713/1, 100

(56) References Cited

U.S. PATENT DOCUMENTS

| 5,014,193 | * | 5/1991 | Garner et al. | 710/10 |
|---|---|---|---|---|
| 5,471,564 | * | 11/1995 | Dennis et al. | 395/114 |
| 5,790,796 | * | 8/1998 | Sadowsky | 709/221 |
| 5,805,571 | * | 9/1998 | Zwan et al. | 370/249 |
| 5,946,487 | * | 8/1999 | Dangelo | 395/705 |
| 5,959,536 | * | 9/1999 | Chambers et al. | 340/636 |
| 5,966,534 | * | 10/1999 | Cooke et al. | 717/5 |
| 6,070,185 | * | 5/2000 | Anupam et al. | 709/204 |
| 6,094,221 | * | 7/2000 | Andersion | 348/231 |

OTHER PUBLICATIONS

Oberg et al., "Grammar–based Hardware Synthesis of Data Communication Protocols," Proceedings of the 9th International Symposium on System Synthesis, 1996, pp. 14–19, 6–8 Nov. 1996.*

* cited by examiner

Primary Examiner—Tuan Q. Dam
(74) Attorney, Agent, or Firm—Gregory M. Doudnikoff

(57) ABSTRACT

A technique for creating client-server applications that permits the client component to be updated remotely, such as over a network or the like, and implementing the updating of a client portion of the application. The client is developed so that certain configurable components thereof may be effectively turned on or off by instructions contained in a bit string and to include parsing functionality for parsing an input bit string. Each configurable component corresponds to a different position in the bit string. When it is determined that the client is down level, the bit string which represents the current preferred client configuration is transmitted to the client. The client parses the bit string, and based on the instruction contained in the position of the bit string which corresponds to each configurable component of the client, turns that component on or off.

5 Claims, 5 Drawing Sheets

TECHNIQUE FOR CREATING REMOTELY UPDATABLE PROGRAMS FOR USE IN A CLIENT/SERVER ENVIRONMENT

BACKGROUND OF THE INVENTION

1. Field of the Invention

The present invention relates to a technique in a computer based data processing system for creating programs for use in a client/server environment which may be updated or modified remotely. More particularly, the present invention relates to a technique by which programs are created which may be updated from a remote program via a network, and the technique for updating the programs.

2. Description of the Related Art

In a client/server environment, an application is often split into a client component (resident at a user's workstation or the like) and a server component (resident at a server) which the clients access to carry out certain functionality of the application. One constant fact about applications is that they are always being changed. This can be more of a problem in the client-server environment because of the relationship of the one server to the many clients, particularly when the clients need to be updated to take advantage of improvements or functionality change in the server portion of the application.

In order to solve this problem today, a number of solutions are used. The owner of each client workstation can manually update the application by loading the latest version of the client application on the client workstation. But this solution is labor intensive, error prone, and does not guarantee that all of the clients will actually be updated.

Application management tools have also been developed that have the capability to distribute new versions of client applications to clients via a network. In order for this technique to work, the client workstation must have the application management tool client installed thereon, so that the application management tool can force the new version onto the client workstation. An example of such an application tool is TME 10 from Tivoli Corporation. However, this technique requires a large amount of overhead, resources and expense. The client portion of the application management tool must be loaded on each client workstation and configured manually upon its initial install. The client application management tool computational resources are the same as larger client-server applications. The software itself and maintenance and support thereof can also be costly.

Over the last few years, object oriented programming has gained in popularity. Developing software applications using an object oriented language in an object oriented development environment can be easier than writing traditional procedural software applications, since object oriented development environments rely extensively on the reuse of code from class libraries, or blocks of code, which are prewritten to form particular functions. Also, object oriented languages, such as Java, have been optimized for use over a network, such as the Internet. (Java is a trademark of Sun Microsystems Inc.)

Accordingly, a need exists for a simple solution for client-server applications that is inexpensive and permits easy updating of the client portion of the application.

Sun Microsystems inc., the developer of the Java programming language, has developed a number of tools to aid Java developers create Java applications. JJTree and JavaCC (the Java compiler compiler) were developed by SUN to test the Java programming language. This was done by having JJTree and JavaCC parse and create test cases that would exercise the Java programming environment. For example, NASA has employed JJTree and JavaCC (the Java compiler compiler) to create a programming language which it employs for programming telemetry into its vehicles. However, to date, these tools and their capabilities have not been applied to the problem of updating client-server appellations.

SUMMARY OF THE INVENTION

An object of the present invention is to provide a system for creating a software application which may be updated after it has been distributed and installed for use with a minimum of effort.

Another object of the invention is to provide a technique for updating an application using a bit string which contains instructions for how the application needs to modify and reconfigure itself.

Other objects and advantages of the present invention will be set forth in part in the description and the drawings which follow, and, in part, will be obvious from the description or may be learned by practice of the invention.

To achieve the forgoing objects, and in accordance with the purpose of the invention as broadly described herein, the present invention provides computer readable code for permitting updating of client applications in a computing environment, comprising first subprocesses for determining whether a client application needs to be updated; second subprocesses for downloading a bit string to the client application containing instructions for reconfiguring the client application if it is determined by the first subprocesses that the client application needs to be updated; and third subprocesses for parsing the bit string and reconfiguring the client application based on instructions contained in the bit string. The client application may comprise a plurality of configurable objects that may be activated by instructions contained in the bit string, and each position in the bit string may correspond to one of the configurable objects. The client application may be a Java application which includes a parsing function, and the first subprocesses may further comprise using a cookie to compare a current application level of the client application with a preferred application level to determine if the current application level needs updating.

The invention also provides a method for creating an application which may be updated remotely without sending application code to the application, comprising the steps of creating an application shell which defines remotely configurable components within an application being developed; enabling the application being developed to parse a bit stream, the location of each bit in the bit stream corresponding to one of the configurable components in the application being developed, and cause the corresponding component to be active or inactive based on an instruction contained in the bit; adding application functionality to the application being developed; and compiling the application being developed.

A system is also provided for updating an application accessible via a network without modifying or adding to code which comprises the application, comprising means for determining whether a current level of an application connected to a network is a desired level, the application comprising components which may be activated or inactivated; if the determining means determines that the current level of the application is not the desired level, means for downloading a bit string to the application via the network;

and means associated with the application for parsing the bit string and activating or inactivating the components based on instructions contained in the bit string.

The present invention also provides a software application comprising computer readable code stored on media, the software application comprising a plurality of components which may be activated or inactivated after the software application has been placed into service, each of the components being addressable by an instruction in a predetermined position in a bit string; first subprocesses for parsing a bit string received via a network; and second subprocesses for activating or inactivating each of the addressable components based on the instruction in the bit string which corresponds thereto. The software application may also be a Java application which serves as a client in a client-server environment, and the network may be the Internet.

The present invention will now be described with reference to the following drawings, in which like reference numbers denote the same element throughout.

DESCRIPTION OF THE PREFERRED EMBODIMENT

Figure 1:
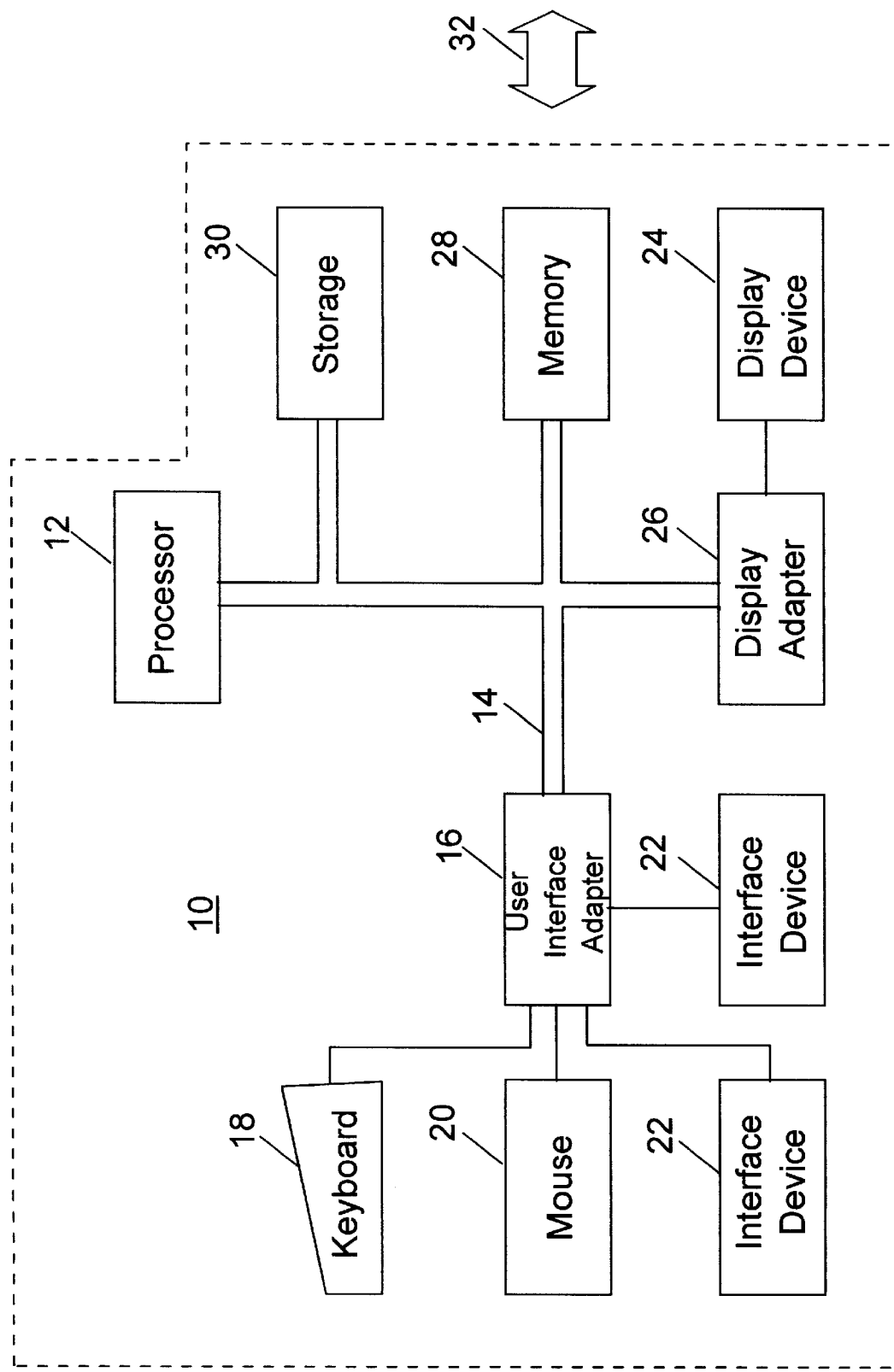
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
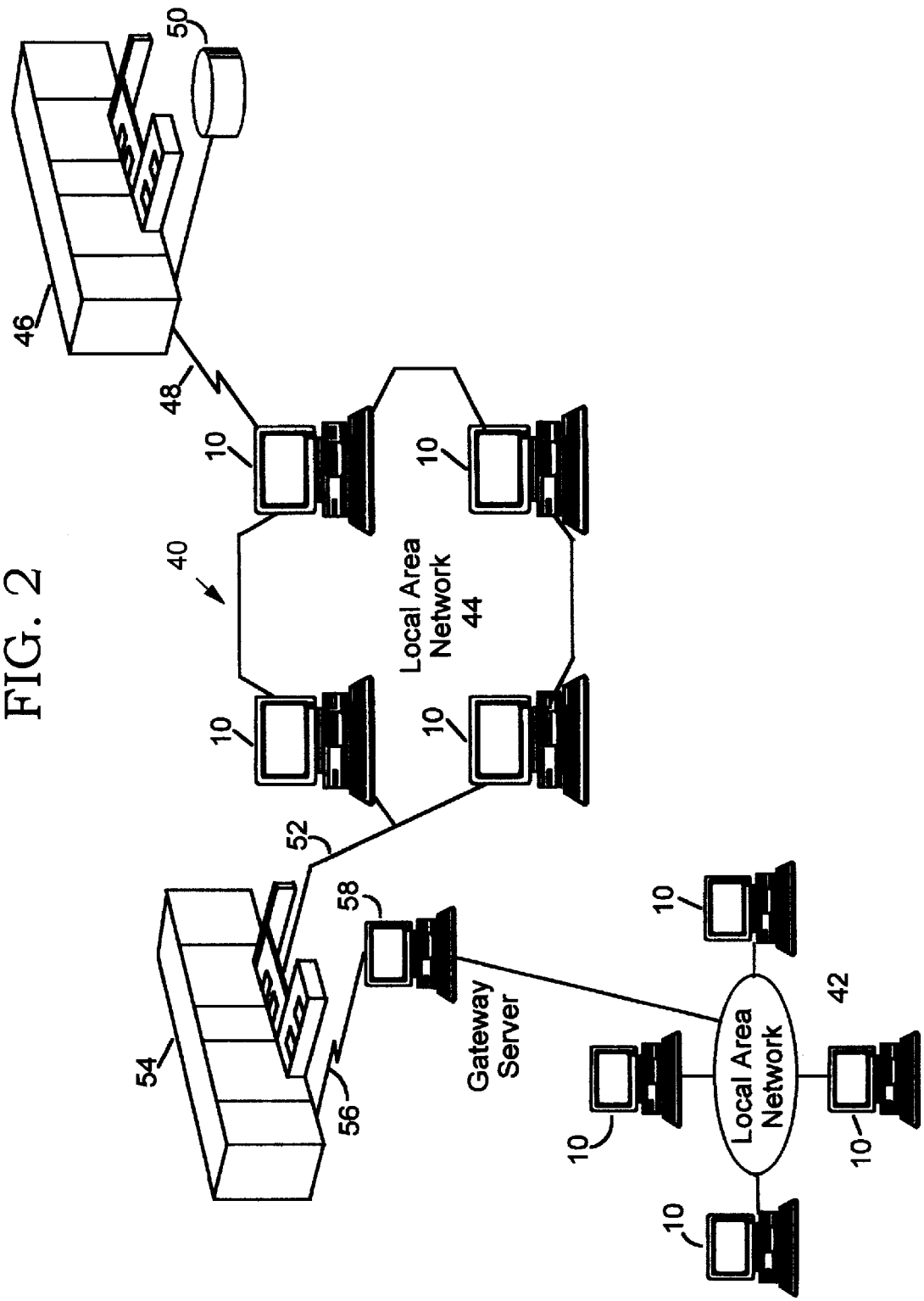
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application Systeim/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 5.

In the preferred embodiment, the present invention is implemented with the Java language and the lexical analysis and parsing tools JJTree and JavaCC. An application is preferably written in Java and the lexical analysis and parsing tools JJTREE and JavaCC which provide parsing and tokenization rules, although it may be implemented in other object oriented languages as long as the other language supports lexical analysis and parsing tools.

Applications in object oriented languages, such as Java, Smalltalk and C++, are typically created in development environments which include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created. However, to provide detailed function or customization for an application being developed, individual classes may have to be created by the developer which are not available in a class library.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein.

Client-server applications tend to be tightly coupled into a client request, communications layer, server process, and client display scenario. This makes simultaneous development of all of the components of the scenario preferable. For example, a client-server application includes a client GUI that presents choices or options to users of the client. These user choices are representative of what the server will process and of what the client presents upon the return of data from the server. When a need arises to add another field to the query of the server, both the client and the server must be modified; the client to provide the field and the server to process a client request which includes data in the field. As discussed above, the presently available option is to update the client and server together and redistribute them for use, which has the drawbacks discussed above.

The present invention permits developers to have functionality in a which may be switched on and/or off remotely via a network, such as the Internet. Classes in the application can be effectively activated or deactivated. In client-server applications, this permits function to be written into the client application that is not immediately needed (or supported by early versions of the corresponding server application). This has a number of potential uses, and may be particularly useful when the users of client applications have limited computer skills. The functionality which may be activated or inactivated can include graphical user interface (GUI) elements, such as buttons, entry fields, etc.

The present invention uses existing Java tools in the development process to create an application capable of parsing binary formatted strings input over a network. The JJTree preprocessor and JavaCC (Java Compiler Compiler) tools are used to create a flexible Java application which responds to a binary formatted string to reconfigure itself into a format specified in the string. The binary formatted string is used by an application specific parse generation to recreate the application in accordance with instructions contained in the string. Thus, by using Java parsing technology which may be added to Java applications using the JJTree and JavaCC tools, an entire client-server application can be generated from previously prepared application formats. These formats are represented by position dependent TRUE and FALSE mechanisms. The Java parser is coded in a generic manner to include all foreseeable options into the binary string format. When a change in the application is desired, a string is created to activate and inactive portions of the application in accordance with the specific architecture of the application, whereby a true statement in one part of the string will cause one component of the application to remain on or be "turned on" when the application is recreated and a false statement in another part of the string will cause another component of the application to remain off or be "turned off" when the application is recreated after the application parses the string.

Figure 3:
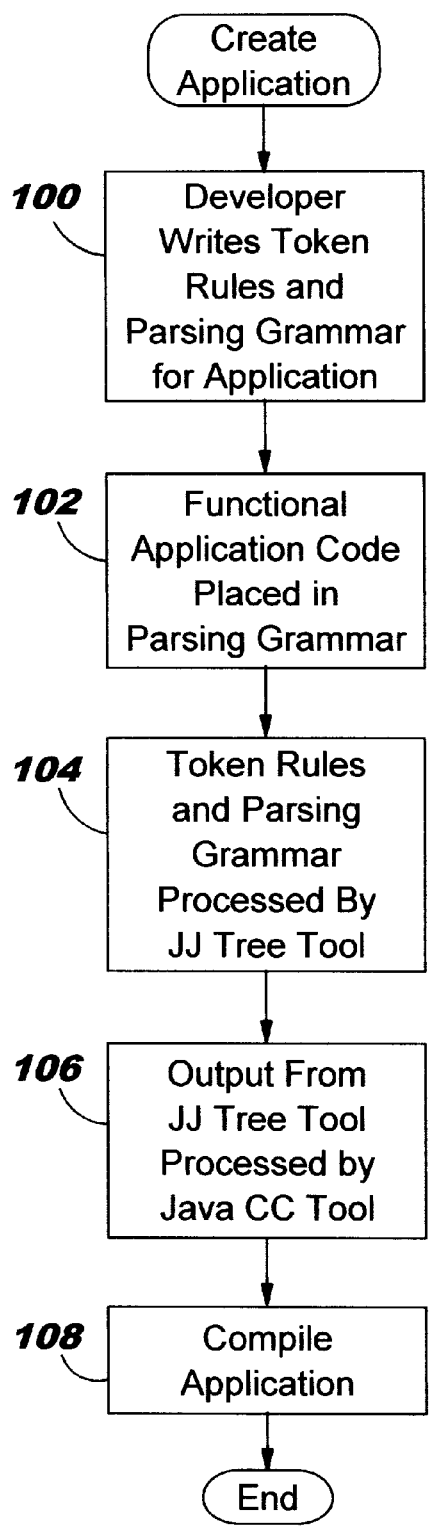
FIG. 3 is a flowchart illustrating the logical steps involved with creating an updatable application in accordance with the present invention.
Figure 4:
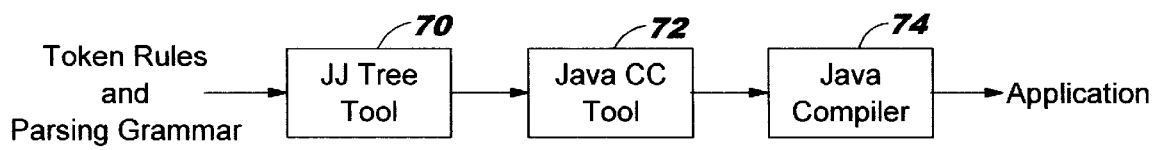
FIG. 4 illustrates a block diagram of the development environment for creating an updatable application in accordance with the present invention.
Figure 5:
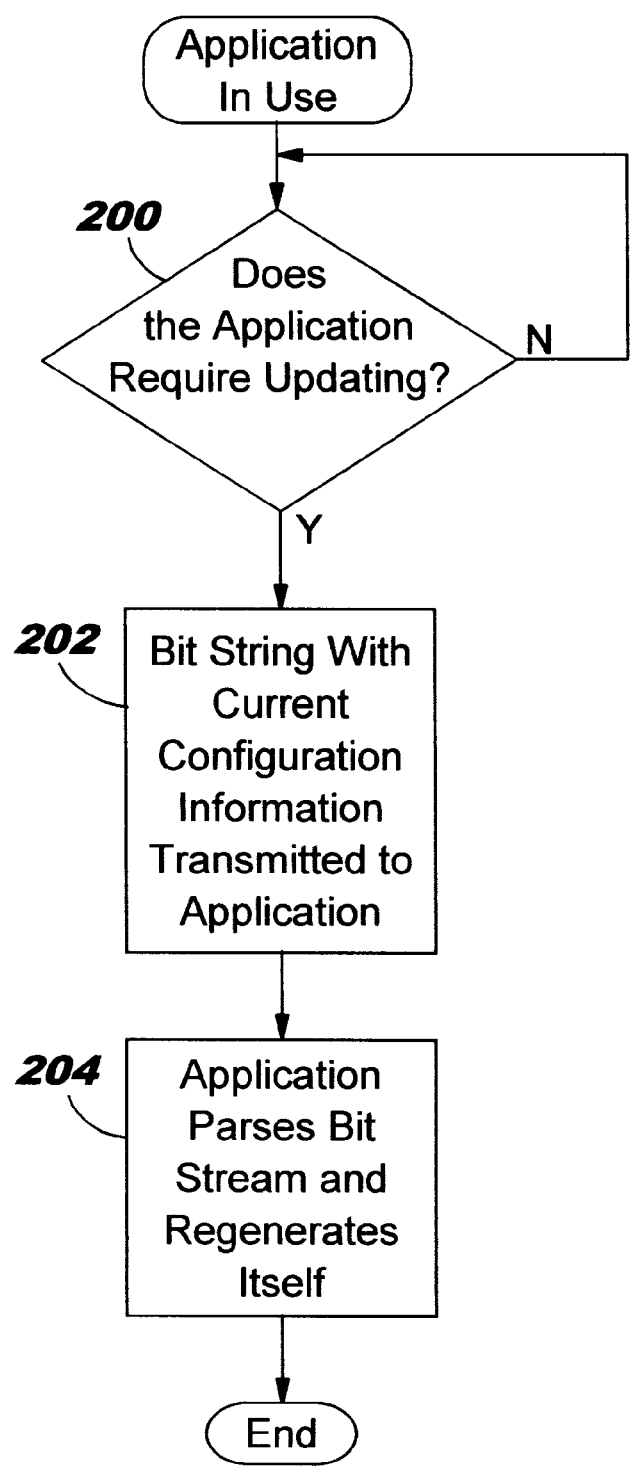
FIG. 5 is a flow chart illustrating the logical steps involved with updating the application after the application has been deployed.

Referring now to the flowchart of FIG. 3 and the diagram of FIG. 4, creation of a Java client-server application is initiated in accordance with known lexical analysis and parsing techniques. Java source code for the application is constructed within the framework of token rules and parsing grammar. However, rather than proceeding with standard development procedures, a developer writes token rules and parsing grammar specifically for the application to be created (.jjt files) (Step 100). These take into account the total number of configurable objects to be included in the application and their relative position to each other in the parsing order. This in effect creates the skeleton for the application being created. The developer places the actual Java code for the application being created, such as the GUI aspects or other functional classes, within the framework of the token rules, which are placed into the parsing grammar (Step 102). The token rules and parsing grammar source code (.jjt files) is processed by the JJTree tool 70 (Step 104), which is a Java tool from Sun Microsystems. The JJTree tool 70 performs lexical analysis (tree and node analysis) of the token rules code input thereto and outputs files which are in .jj format. The JJTree tool 70 also acts as a preprocessor for the JavaCC tool 72, and the .jj files are specifically created to permit processing thereof by the JavaCC 72. Accordingly, for example, for a filename phoo.jjt, after input to the JJTree tool, phoo.jj is output.

The JavaCC 72 is run against the .jj files output from the JJTree tool 70 to create the parser source code for the application, thereby adding the parser function to the application being developed (Step 106). In the above example, the phoo.jj file is input to the JavaCC 72, which creates tokenized filenames associated to the parse with an extension of java. Then, the application files are compiled by a standard Java compiler 74 (Step 108) in accordance with known techniques to create executable programs for the Java runtime environment in which the client application will execute.

The lexical analysis carried out by the JJTree tool effectively maps the application in accordance with the developer's instructions, so that the developer knows the relative position of each configurable component which is included in the application. With the addition of the parsing function, each component can be effectively addressed by a single binary string. The length of the positional dependent binary string denotes the number of configurable objects in the application. Each position within the string denotes the location of a configurable object instantiation with the context of the application. The grammar of the string for turning on or off an object within the application is then simply a matter of placing a "1" or "0" in the position of the string which corresponds to the object.

Defaults are defined into the tokenization and parsing grammar in Step 100 to define the initial (default) configuration of the client and server components of the application. The application is then distributed to users and loaded onto server and client machines in accordance with known techniques.

The process involved with modifying or updating the application after it has been distributed and placed in use will now be discussed with reference to the flowchart of FIG. 5.

Typically, the administrator of the client-server application will control the server. Updating the server is then a relatively straightforward process. An administrator can use known techniques and tools, such as an editor, to create a character string. Based on the knowledge of which position in a string effects which configurable object of the application, the administrator programs into the string data to maintain, activate or deactivate configurable objects within the application, and forwards this string to the application to implement the changes. The application parses the string, and updates the application based on the instructions contained in the string. Since the application has already been compiled, no additional processing is necessary. The updated application is ready for use immediately.

Typically, the administrator will have less control over the updating of client applications, as they will often be locations remote from the server. FIG. 5 illustrates a flowchart which shows the logical steps involved with the updating of one of the client applications. First, a determination must be made that the client needs to be updated (Step 200). This can be performed in a number of ways. For example, the client can be programmed to check to see if its current configuration is still the proper configuration each time it accesses the server. This can be hard coded into the client and server, or carried out through the use of a cookie. Cookies are well known in the context of Java applications. In this situation, a cookie can be added to the client during development which includes information regarding the version or level of the client. When the client accesses the server or the Internet or the like, the information on the cookie is compared with information at the server regarding the current preferred state of the clients. If the data does not match, then the client needs to be updated. The server application can be located on a web server running at a web site, and all this can be carried out over the Internet. If no cookie is present on the client, a JavaScript executable included on the client can create a cookie having information regarding the last update or the current level. Creation of a cookie with client information and use of cookies in a client-server setting are known procedures. Any number of techniques can be used to determine if the current version of the client needs to be updated or not, including automatically checking the configuration after the passage of a certain amount of time, the regular downloading of a current bit stream from the server to the client without a determination of a need, etc.

If it is determined in Step 200 that the current level of the client is old, processing proceeds to Step 202, in which the server transmits to the client the bit string which contains the current configuration information. The bit string which contains the configuration data can be very simple, having a total length of the number of configurable objects, with each position in the bit string corresponding to a particular configurable object. For example, if the client application contains 16 configurable objects, the bit string can take the form "0011010010100111", where each "1" represents a "true" statement and will cause the corresponding object to be activated (or stay activated) and each "0" corresponds to a "false" statement can will cause the corresponding object to be inactivated (or stay inactivated). The client then parses the bit stream, and regenerates the application in accordance with the instructions contained in the bit stream (Step 204). That is, the configurable components are activated, deactivated or remain active or inactive. Since the client has already been compiled, no additional processing is required. If an update has been made, the client may need to be re-initiated in order to provide the user with the updated GUI and/or appropriate functionality. Processing then ends relative to the updating of the client.

The present invention provides a number of advantages over existing techniques. First, the size of the update (in the form of the string) is very small. Little network bandwidth is utilized, rendering the update process quite cost effective. Little or no user intervention is required by the users of clients. The update process itself is practically transparent to the user. The amount of time required to update the client is also minimal. Also, the chance for error, either user-based or codebased, is also minimized, since user intervention is minimal and the new client has already been written, thus it is hard to introduce new errors from a software perspective.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. Computer readable code stored on computer-readable media for permitting updating of client applications in a computing environment, comprising:

first subprocesses for determining whether a client application needs to be updated by using a cookie to compare a current application level of the client application with a preferred application level to determine if the current application level needs updating, wherein the client application is a Java application which includes a parsing function;

second subprocesses for downloading a bit string to the client application containing instructions for reconfiguring the client application if it is determined by said first subprocesses that the client application needs to be updated, wherein the client application comprises a plurality of configurable objects that may be activated by instructions contained in the bit string and each position in the bit string corresponds to one of the configurable objects; and third subprocesses for parsing the bit string and reconfiguring the client application based on instructions contained in the bit string.

2. A method for creating application which may be updated remotely without sending application code to the application, comprising the steps of:

creating an application shell which defines remotely configurable components within an application being developed;

enabling the application being developed at parse a bit stream, the location of each bit in the bit stream corresponding to one of the configurable components in the application being developed, an cause the corresponding component to be active or inactive based on an instruction contained in the bit;

adding application functionality to the application being developed; and compiling the application being developed.

3. In a computing environment, a system for updating an application accessible via a network without modifying or adding to code which comprises the application, comprising:

- means for determining whether a current level of an application connected to a network is a desired level by using a cookie to compare the current level to the desired level, the application comprising components which may be activated or inactivated, wherein the application is a Java application;
- if said determining means determines that the current level of the application is not the desired level, means for downloading a bit string to the application via the network, wherein each position in the bit string corresponds to one of the components; and
- means associated with the application for parsing the bit string and activating or inactivating the components based on instructions contained in the bit string.

4. A software application comprising computer readable code stored on media, said software application comprising:

- a plurality of components which may be activated or inactivated after the software application has been placed into service, each of the components being addressable by an instruction in a predetermined position in a bit string;
- first subprocesses for determining whether a current level of the software application needs updating by using a cookie associated with the software application having current level information to compare the current level to a desired level, the desired level included in information downloaded from a network;
- second subprocesses for parsing a bit string received via the network if it is determined that the current level of the software application is not the desired level;
- third subprocesses for activating or inactivating each of the addressable components based on the instruction in the bit string which corresponds thereto; and
- fourth subprocesses for updating the cookie with new level information following completion of said third subprocesses.

5. The software application according to claim 4, wherein the software application is a Java application which serves as a client in a client-server environment, and the network is the Internet.

* * * * *